US010006417B2

(12) United States Patent
Satarino (10) Patent No.: US 10,006,417 B2
(45) Date of Patent: Jun. 26, 2018

(54) ADAPTIVE AIR INTAKE SEALING JOINT

(71) Applicant: Toledo Molding & Die, Inc., Toledo, OH (US)

(72) Inventor: Charles Satarino, Milan, MI (US)

(73) Assignee: Toledo Molding 7 Die, Inc., Toledo, OH (US)

(*) Notice: Subject to any disclaimer, the term of this patent is extended or adjusted under 35 U.S.C. 154(b) by 355 days.

(21) Appl. No.: 14/818,887

(22) Filed: Aug. 5, 2015

(65) Prior Publication Data

US 2016/0040635 A1 Feb. 11, 2016

Related U.S. Application Data

(60) Provisional application No. 62/033,897, filed on Aug. 6, 2014.

(51) Int. Cl.

| F16L 33/00 | (2006.01) |
|---|---|
| F02M 35/10 | (2006.01) |
| F16L 21/00 | (2006.01) |
| F16L 21/08 | (2006.01) |
| F16L 25/00 | (2006.01) |
| F16L 33/02 | (2006.01) |

(52) U.S. Cl.
CPC ...... *F02M 35/10144* (2013.01); *F02M 35/10124* (2013.01); *F02M 35/10137* (2013.01); *F02M 35/10321* (2013.01); *F02M 35/10347* (2013.01); *F02M 35/10354* (2013.01); *F16L 21/007* (2013.01); *F16L 21/08* (2013.01); *F16L 25/0018* (2013.01); *F16L 33/00* (2013.01); *F16L 33/02* (2013.01)

(58) Field of Classification Search
CPC .... F16L 33/04; F16L 33/06; F02M 35/10137; F02M 35/10144
USPC ......................... 285/903, 226, 235, 236, 237
See application file for complete search history.

(56) References Cited

U.S. PATENT DOCUMENTS

| 3,084,959 A | 4/1963 | Stanton | |
|---|---|---|---|
| 3,682,503 A * | 8/1972 | Bloom | F16L 21/002 285/369 |
| 3,873,137 A * | 3/1975 | Yamaguchi | F16L 47/26 285/226 |
| 4,152,014 A * | 5/1979 | Soeffker | F16L 33/08 285/903 |
| 4,643,465 A * | 2/1987 | Green | F16L 21/005 285/236 |
| 5,039,137 A * | 8/1991 | Cankovic | F16L 21/005 285/236 |

(Continued)

FOREIGN PATENT DOCUMENTS

| GB | 2157385 | 10/1985 |
|---|---|---|
| JP | 3587881 | 11/2004 |

*Primary Examiner* — David Bochna
(74) *Attorney, Agent, or Firm* — McHale & Slavin, P.A.

(57) ABSTRACT

An adaptive air intake joint for an internal combustion engine comprising a molded elastomeric duct body having standing ribs constructed and arranged to provide a continuous and sufficient contact force across the face of a joint of an adjoining duct body. A clamp secured to the duct causes the ribs to provide a continuous and sufficient contact force across a seal surface, eliminating the need for constant tension clamp and improving the air intake joint seal to prevent leakage that is especially common in cold environments.

8 Claims, 8 Drawing Sheets

(56) References Cited

U.S. PATENT DOCUMENTS

| | | | | |
|---|---|---|---|---|
| 5,133,579 A * | 7/1992 | Anderson | ............... | F16L 51/03 |
| | | | | 285/226 |
| 5,190,322 A * | 3/1993 | Hughes | ............ | F02M 35/10347 |
| | | | | 285/236 |
| 5,398,976 A * | 3/1995 | Webb | ...................... | F16L 39/00 |
| | | | | 285/236 |
| 5,568,944 A * | 10/1996 | Kawasaki | ........ | F02M 35/10144 |
| | | | | 285/236 |
| 5,682,924 A * | 11/1997 | Powell | ............ | F02M 35/10144 |
| | | | | 285/331 |
| 5,924,282 A * | 7/1999 | Thomas | .............. | F16L 25/0036 |
| | | | | 285/903 |
| 6,394,505 B1 * | 5/2002 | Schmucki | ............... | F16L 25/14 |
| | | | | 285/236 |
| 6,607,218 B2 * | 8/2003 | Sakazaki | ................. | F16L 33/01 |
| | | | | 285/226 |
| 6,874,822 B2 * | 4/2005 | Yasuda | ................... | F16L 21/06 |
| | | | | 285/236 |
| 7,464,968 B2 * | 12/2008 | Sakazaki | ................. | F16L 33/18 |
| | | | | 285/236 |
| 8,251,036 B2 * | 8/2012 | Williams | ......... | F02M 35/10137 |
| | | | | 123/184.21 |
| 8,801,049 B2 * | 8/2014 | Knapp | ................ | F16L 25/0036 |
| | | | | 285/903 |
| 2007/0170721 A1 | 7/2007 | Cook | | |

\* cited by examiner

ADAPTIVE AIR INTAKE SEALING JOINT

CROSS REFERENCE TO RELATED APPLICATION

In accordance with 37 C.F.R. 1.76, a claim of priority is included in an Application Data Sheet filed concurrently herewith. Accordingly, the present invention claims priority to U.S. Provisional Patent Application No. 62/033,897, filed Aug. 6, 2014, entitled "Self Sealing Air Intake Outlet Joint", the contents of which is incorporated herein by reference.

FIELD OF THE INVENTION

This invention is directed to the automotive field and, in particular, to an adaptive air intake sealing joint for an internal combustion engine.

BACKGROUND OF THE INVENTION

The designs of air intake ducts for internal combustion engines are largely dependent upon the amount of space available within an engine compartment. Engine compartments are typically designed to use most all available space yet the need remains for fresh air to be collected from outside the engine compartment for optimum engine performance. In this regard, the air intake ducts have become more complex as the duct must be drawn through various angular positions so as to avoid engine accessories. It is known that proper ducting will attenuate the sound of the engine.

A problem with conventional ducting is the sealing of joint between coupled tubing. Over a period of time, tubing joints are known to relax resulting in leakage. Leakage is especially problematic if it occurs after a filtration system but leakage at any joint can change the dynamics of the combustion process, affecting both engine efficiency and noise control.

Improvements to air intake ducts continue as the engine compartments have a reduction in space while engine sizes remain the same or are increased in size.

U.S. Pat. No. 8,528,692 discloses an air intake duct with a simplified attachment to a cover member.

U.S. Pat. No. 6,553,953 discloses at least a part of a duct wall of a suction duct that is formed out of a molded body of non-woven fabric. The non-woven fabric contains a thermoplastic resin binder.

U.S. Pat. No. 6,959,678, discloses a method for making an air intake apparatus. The method includes a holding-portion forming step, a temporary fixing step, and a joining step. In the holding-portion forming step, a holding portion is formed. In the temporarily fixing step, the porous member is held by the holding portion. In the joining step, the holding portion and the porous member are joined together. In the air intake apparatus manufactured by this manufacturing method, a peripheral portion of the porous member is doubly sealed with the holding portion that is an outer edge part of the opening. Consequently, the opening is reliably covered with the porous member so that intake noise is reliably reduced.

U.S. Pat. No. 7,191,750 discloses an intake manifold assembly including an inner shell that is inserted into an outer shell, and a cover that seals the open end of the outer shell. The inner shell includes dividers that form air passages. A laser device is traversed along the outer surface of the outer shell along a path which corresponds with the inner shell to form a laser weld joint. The intake manifold assembly of this invention includes features and methods of assembly that improve the laser weld joints utilized to assemble the plastic intake manifold assembly.

U.S. Pat. No. 7,322,381 discloses a duct main body which is formed into a hollow tubular shape having in an interior thereof an intake passageway for introducing outside air into an internal combustion engine by connecting integrally a plurality of divided bodies such as a first divided body and a second divided body which are formed of a thermoplastic resin and has, in a duct wall of the second divided body, an opening which establishes a communication between the inside and outside of the intake passageway.

U.S. Pat. No. 7,475,664 discloses an engine intake manifold assembly, including a first component having a first mating surface and a second molded plastic component having a second mating surface. The second molded plastic component is adhesively bonded to the first component with an adhesive. The adhesive bond strength exceeds the strength of the second molded plastic component.

U.S. Publication No. 2004/0226531 discloses an air intake apparatus including an air intake duct provided with an inlet through which intake air is introduced, an air cleaner disposed on the downstream side of the air intake duct for filtering the intake air, and an air cleaner hose disposed on the downstream side of the air cleaner and for supplying the filtered intake air to a combustion chamber of an engine, wherein an intake air passageway is laid out between the inlet and the combustion chamber.

U.S. Publication No. 2004/0226772 discloses a permeable port constituted by an aperture and a porous member for covering an aperture that is provided in a part of an intake air passageway portion of an air intake apparatus. The permeable port is disposed in at least a part of a region between the central position of the whole length of an air intake duct and the central position of the whole length of the intake air passageway portion.

U.S. Publication No. 2004/0231628 discloses an engine intake manifold assembly, including a first component having a first mating surface and a second molded plastic component having a second mating surface. The second molded plastic component is adhesively bonded to the first component with an adhesive. The adhesive bond strength exceeds the strength of the second molded plastic component.

What is provided is an adaptive sealing technology for automotive air intake system joints.

SUMMARY OF THE INVENTION

An adaptive air intake joint sealing feature comprising a single or plurality of circumferential ribs molded into the clamping surface of an elastomeric tube, arranged to provide continuous and sufficient contact forces at the joint to maintain a proper seal.

An objective of the instant invention is to provide an adaptive means of maintaining a seal at an air intake joint.

Another objective of the instant invention is to provide continuous and sufficient contact forces across a seal surface, eliminating the need for constant tension clamps.

Still another objective of the instant invention is to improve upon the air intake outlet joint to prevent leakage especially prevalent in cold environments.

Still another objective of the instant invention is to maintain acceptably low assembly forces, which could otherwise be negatively impacted by oversized sealing beads or increased interference between surfaces comprising the seal interface.

Still another objective of the instant invention is to eliminate the need to over-tighten a clamp used to maintain sealing forces, which can cause further distortion of the clamped materials and exacerbating the tendency to leak.

Other objectives and further advantages and benefits associated with this invention will be apparent to those skilled in the art from the description, examples and claims which follow.

DETAILED DESCRIPTION OF THE PREFERRED EMBODIMENT

A detailed embodiment of the instant invention is disclosed herein, however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure. The embodiment described herein has been proven in practice to resolve severe leakage issues compared to duct designs not incorporating the circumferential ribs, which would otherwise have required the use of expensive constant-tension clamps.

Figure 1:
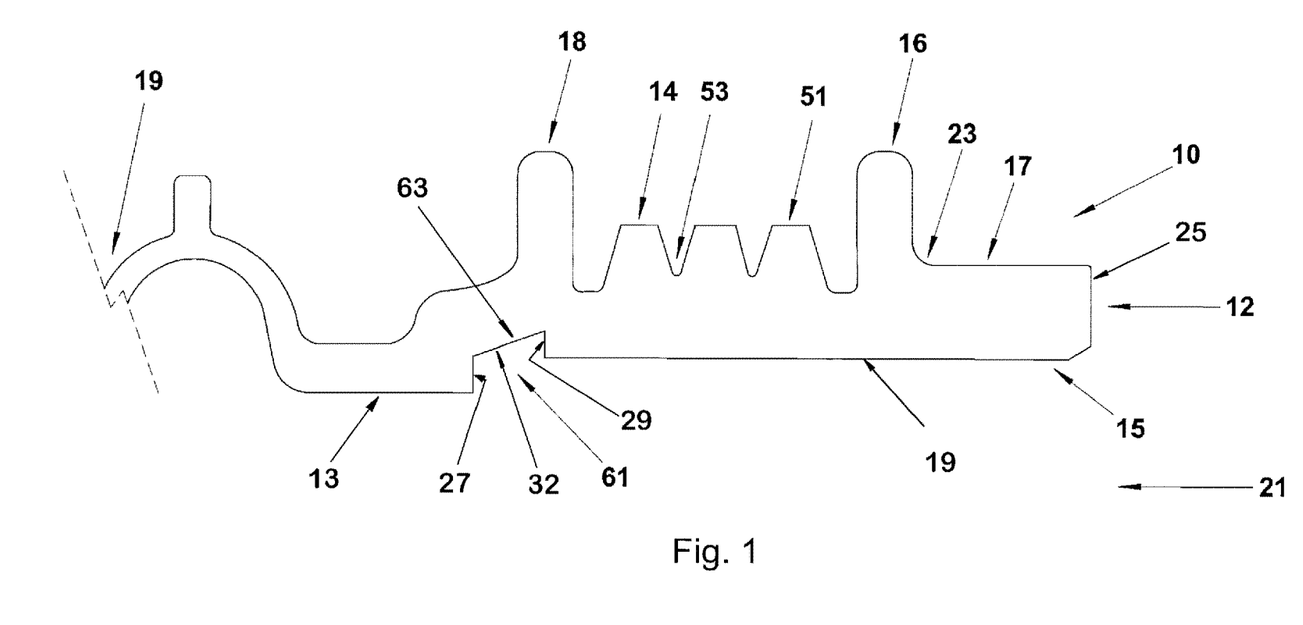
FIG. 1 is a cross sectional view of a duct with molded standing ribs.

Referring now to FIG. 1, depicted is a duct 10, having a construction consisting of a singular tubular piece of material. For purposes of this discussion, the material of construction may consist of rubber, TPE (thermoplastic elastomer), TPV (thermoplastic vulcanizates) or the like. The duct may consist of a combination of different materials including those that could be overmolded, co-injected, or otherwise joined. A receptacle duct 10 has a side walls 16 and 18 with a series of ribs 14 that are molded around the entire circumference of the duct. The ribs 14 in the preferred embodiment consist of three standing ribs of a rubber material capable of deformation sealing upon compression. The standing ribs 14 are positioned between side walls 16 and 18 so as to maintain a clamp in position once installed.

Figure 2:
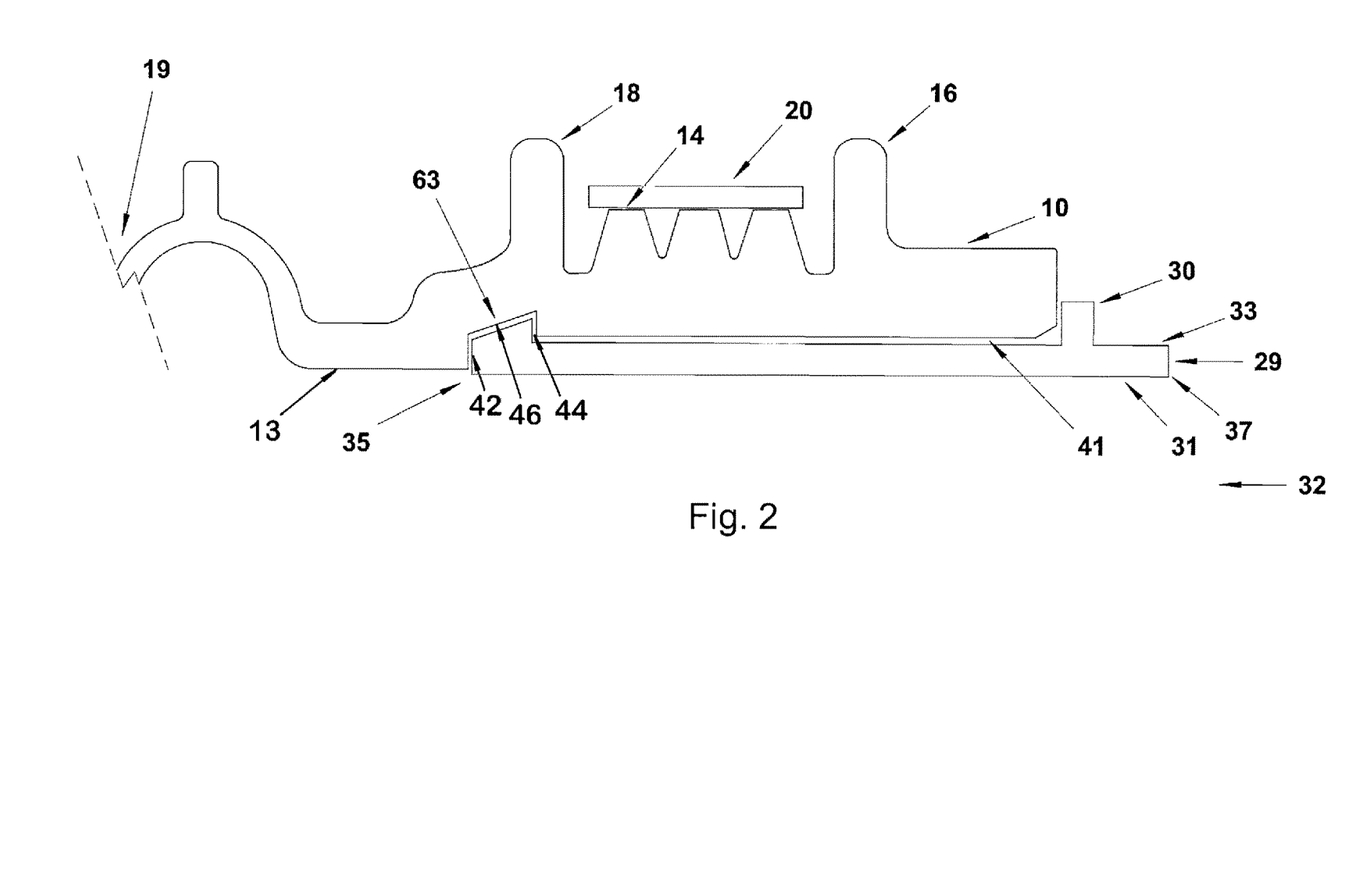
FIG. 2 is a cross sectional view of the duct depicted in FIG. 1 with a clamp.

FIG. 2 illustrates the standing ribs 14, placed between side walls 16 and 18, with a clamp 20 tightened over the standing ribs so as to cause compression and create a sealing of a joint 41 formed between the receptacle duct 10 and the inner, generally rigid inserted duct member 37. Joints between adjoining tubular pipes are notorious for leaking especially when a vehicle is used in extreme temperature variations or after a vehicle has aged. Cycling of the engine can result in conventional ducts experiencing compression set that results in lowered sealing forces at the interface, thus causing loosening and leaks. Additionally, shape changes in the adjoining solid duct due to thermally induced expansion or contraction, softening, and plastic creep can be overcome by elastomeric ducts so endowed with circumferential or "sawtooth" like ribs.

When the clamp 20 is properly torqued the standing ribs 14 are slightly compressed. Rubber-like materials tend to exhibit incompressible properties and, when solid, generally limit the benefit of the material's elasticity in maintaining proper sealing forces. When ribbed, the space between ribs can be filled by the ribs as they are compressed radially by the clamp, expanding laterally, thus enabling the storage of elastic forces that can be used to maintain contact forces normal to the sealing interface during changing conditions. In an effort to optimize the storage and application of stored elastic forces, the shapes of individual ribs, shapes of gaps between ribs, the relative height of the ribs, and even the material properties of the ribs can be modified. Variations in the ribbing can be lateral as well as circumferential in order to adapt to uneven clamp loading arising from clamp style or underlying duct structure. This can offer enhanced adaptability for distortion of the solid mating surface due to diameter, thickness, clamp loads, material selection, and thermally induced loads and shape changes, etc. Intuitively, such ribbing applied to the sealing surface seems obvious, but do not perform well due to their tendency to fold, buckle, or roll over during assembly and clamping, thus creating leak paths. Employing the ribs outside the mating surface prevents this issue. They can be adjusted in shape, size, and material to adjust for displacement relative to bore distortion which differs depending on diameter, thickness and torque loads. Vibrations, temperature variations and the like are examples of environmental changes that typically cause a joint to leak are prevented as the ribs accommodate for changes in the joint.

Figure 3:
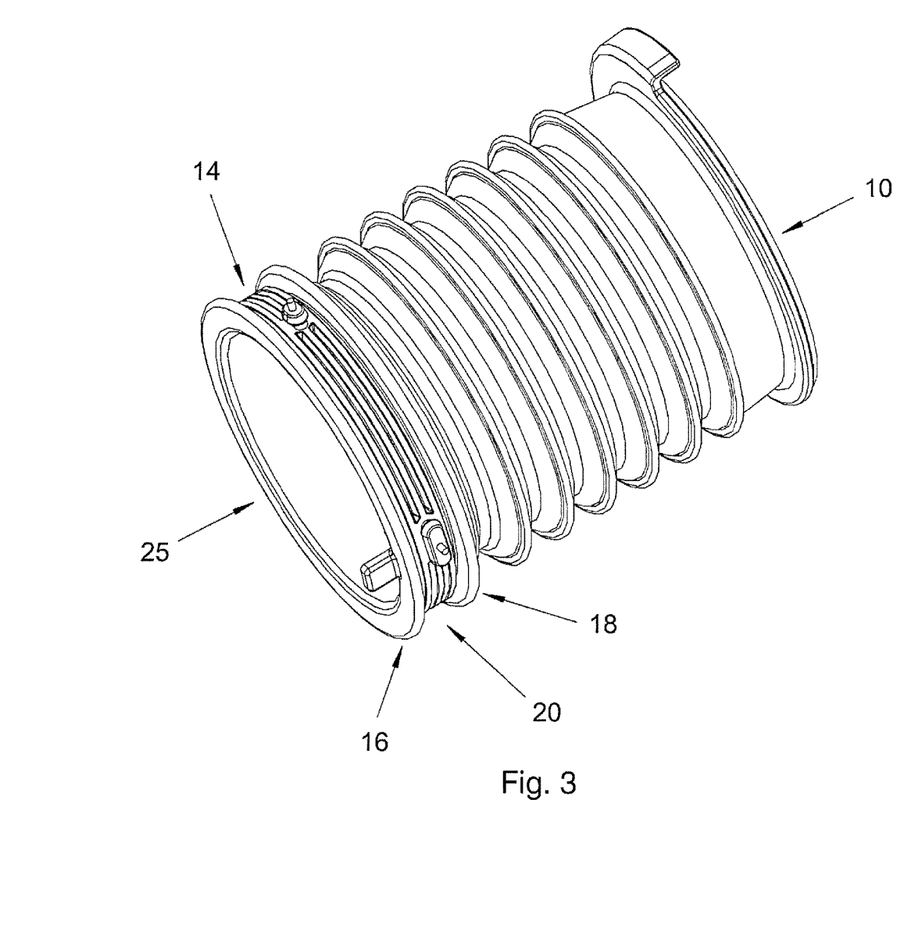
FIG. 3 is a perspective view of a rubber, TPE or TPV duct.

FIG. 3 is a perspective view of the duct 10, having wherein a clamp is positionable between the ridges 16 and 18 so as to secure the duct 10 against an appropriately-sized duct that fits within the receptacle end 25. In this embodiment, the duct 10 is of a corrugated shape allowing for ease of bending along the length of the structure. The receptacle end 25 receives an insertion end, not shown, that interfaces with the interior surface of the receptacle end 25. The ribs 14 receive the clamp to provide compressive forces to the receptacle end to capture the insertion end.

Figure 4A:
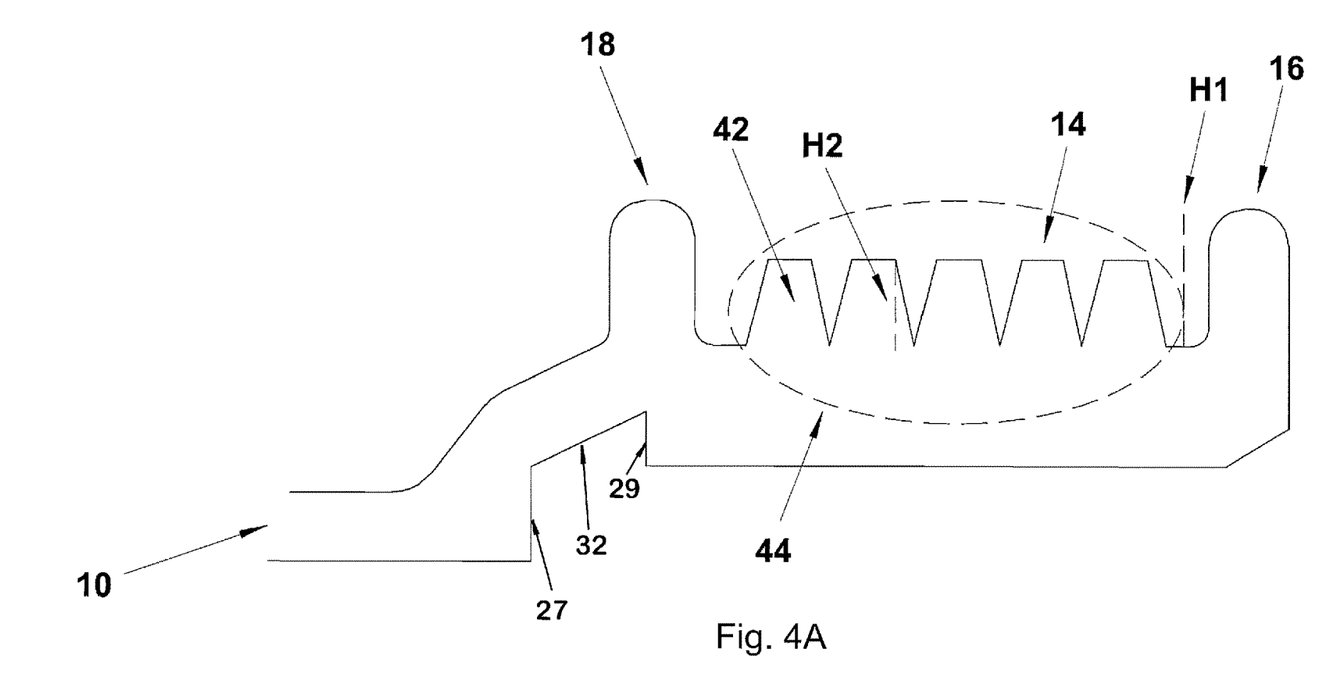
FIG. 4A is a side view of a non-solid area with square top ribs.

Referring to FIG. 4A, illustrated duct 10 has standing ribs 14 defining a non-solid area 44 beneath and/or around the ribs 14, which provide a step load on the joint when compressed. The ribs 14 are preferably constructed from elastomeric (rubber, TPV, TPE etc.) and molded in as part of the base duct 10.

Figure 4B:
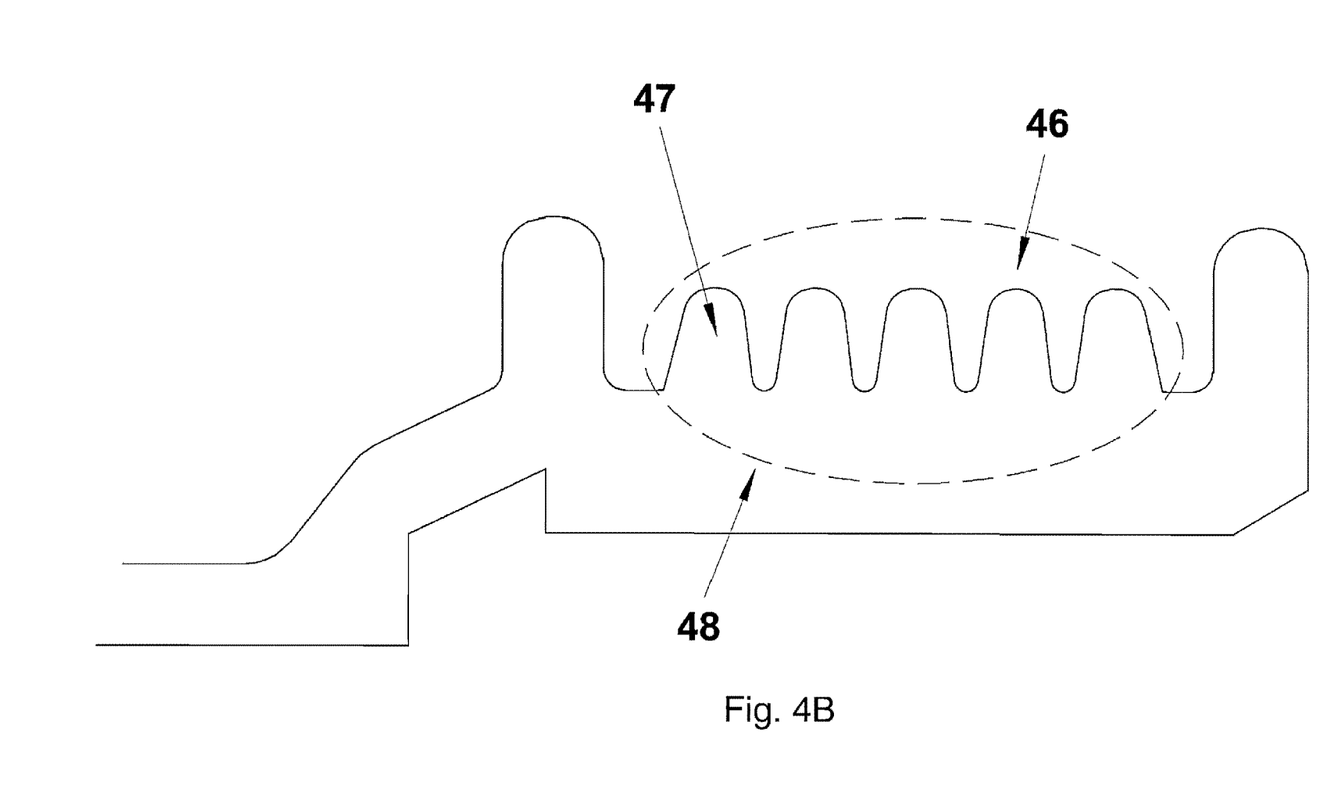
FIG. 4B is a side view of a non-solid area with round ribs.
Figure 4C:
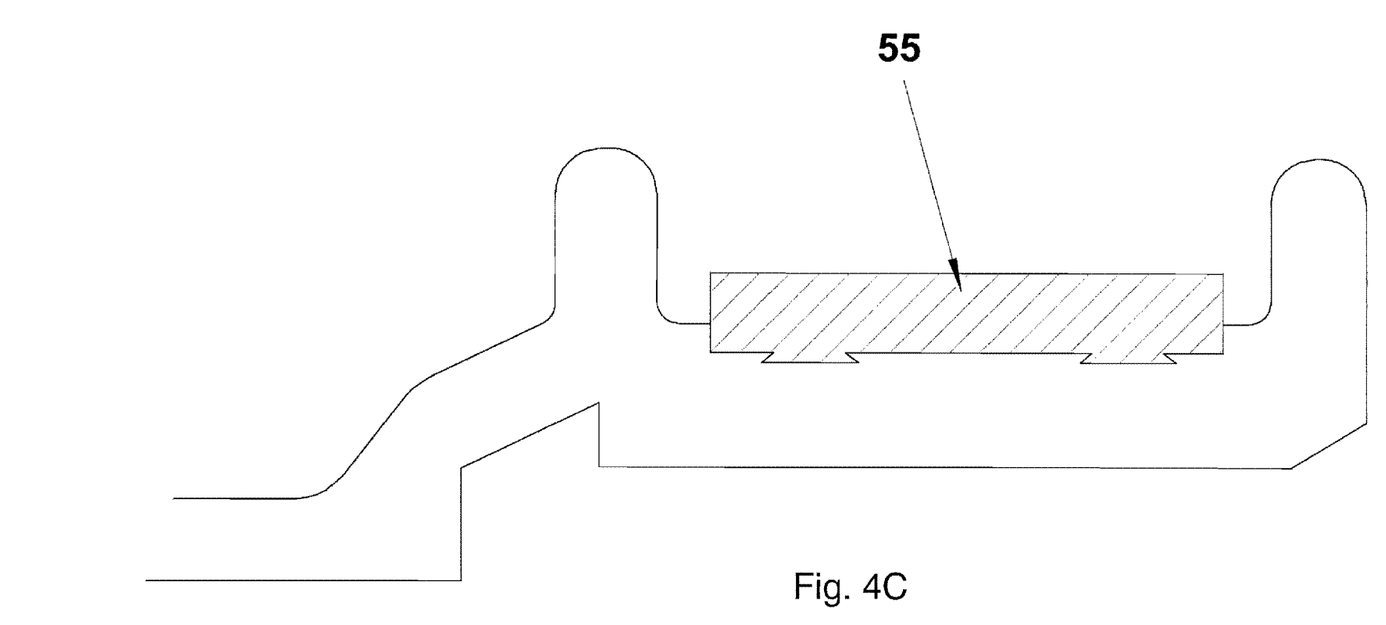
FIG. 4C is a side view of an alternative embodiment having compressible material adjoined to the base.

Similarly, FIG. 4B, alternative embodiment depicts standing ribs 46 having a non-solid area 48 which, upon compression, puts a step load on the joint with flat tops 42. The ribs depicted in FIG. 4A are shown as a flat top, and in FIG. 4B shown as a rounded top. Material 47 of construction remains the same in the two embodiments. FIG. 4C depicts an alternative embodiment where an alternate compressible material (55) is adjoined to the base duct through typical manufacturing methods like bonding, overmolding, welding, mechanical fastening, and co-injection, etc. These illustrations highlight where the duct is altered to function similar to a constant tension clamp. Constant tension clamps, not shown, are clamps known wherein a compression clamp includes integrated springs which flex during compression. However, the clamps are dependent upon proper installation and the springs are typically located on a particular circumference section of the clamp requiring proper torque in order to obtain proper sealing. In comparison, the instant invention includes ribs that are molded around the entire circumference of the duct, wherein a clamp providing compression provides uniform clamping around the circumference of the joint.

The adaptive air intake joint is for an internal combustion engine comprising a first tubular shaped duct defined by an interior and exterior surface with at least one receptacle end; a second tubular shaped duct defined by an interior and exterior surface with at least one insertion constructed and arranged to fit within said receptacle end forming a joint therebetween, said receptacle end having at least one rib positioned around the circumference of the exterior surface of said first duct; and a clamp positioned over said rib wherein the restricting of the clamp circumference seals the joint whereby the rib provides a constant pressure on the joint to maintain the seal.

The adaptive air intake joint comprises a first duct body (12) having an interior surface (15) and an exterior surface (17). The interior surface (15) provides a first air flow passageway (21) between a first end (19) and a receptacle end (23). At least two ribs (14) are positioned over the exterior surface (17) of the receptacle end (23). A second duct body (29) has an interior surface (31) and an exterior surface (33). The interior surface (31) of the second duct body 29 provides a second air flow passageway (32) between an insertion end (35) and a second end (37), said insertion end 35 insertable into the receptacle end (23) of the first duct body (12) with the exterior surface (33) of the insertion end (35) constructed and arranged to frictionally engage the interior surface (15) of the receptacle end (23) to form a joint (41). A clamp (20) is positioned over the ribs (14) wherein the clamp (20) is tightened to cause compression of the ribs (14) to provide a constant pressure on the joint (41). The first duct body (12) and the second duct body (29) forming a sealed passageway between the first (19) and the second ends (37).

The ribs (14) are preferably molded into the duct (12) if the duct material is flexible or formed by the process of overmolding or co-injection for securing a second flexible material such as rubber to the receptacle end providing peaks (51) and valleys (53) in the form of a sawtooth shape. The peaks (51) can be rounded or flat (42). The ribs may include first (16) and second walls (18) positioned on either side of said ribs (14). Each side wall having a height (H1) greater than a height (H2) of the ribs (14) which helps position a clamp, and maintains the clamp over the joint despite the movement of the vehicle, i.e. off road use.

In the preferred embodiment, the first body (12) and said second duct body (29) are tubular shaped. The shape directed by the placement of the duct within an engine compartment and may combine different shapes to meet the application.

The adaptive air intake joint includes a catch tab (61) on the interior surface (15) of said receptacle end (23). The catch tab (61) is positioned between a first continuous sidewall section (13) and a second continuous sidewall section (19) and formed from a first catch wall (27) extending perpendicular outwardly from the interior surface (15) of the first duct body (12). A second catch wall (29) extends perpendicular outwardly from the interior surface (15) of the second continuous sidewall section (19). A sloped catch wall (32) formed between the first (27) and second (29) catch walls. The first duct body (12) further defined by an exterior surface (17) having at least two flexible ribs (14) located between the first (16) and second (18) walls extending around said exterior surface (17). The insertion end (35) is formed in the shape of a latching tab (63) constructed and arranged to engage the catch tab (61). The latching tab (63) is constructed and arranged to fit within said catch tab (61) of the first duct body (12) and an interior surface (31) is formed by an insertion end (35) providing substantially the same diameter as the first duct body sidewall section (13). The latching tab (63) having a front insertion wall (42) with substantially the same orientation of the first catch wall (27). A rear insertion wall (44) with substantially the same orientation of the second catch wall (29). And a sloped insertion wall (46) with substantially the same orientation of the sloped catch wall (32) arranged to frictionally engage the catch tab (61). The first duct body (12) and the second duct body (29) form a sealed passageway (32) without an overlapping joint protruding into the passageway. The exterior of the insertion end includes a rear wall (30) for capturing the receptacle end (23) between the catch tab (61) and rear wall (30). The ribs (14) are sawtooth in nature to allow for compressibility during tightening of the clamp (20). The compressible area essentially placing a step load on the joint.

Figure 5:
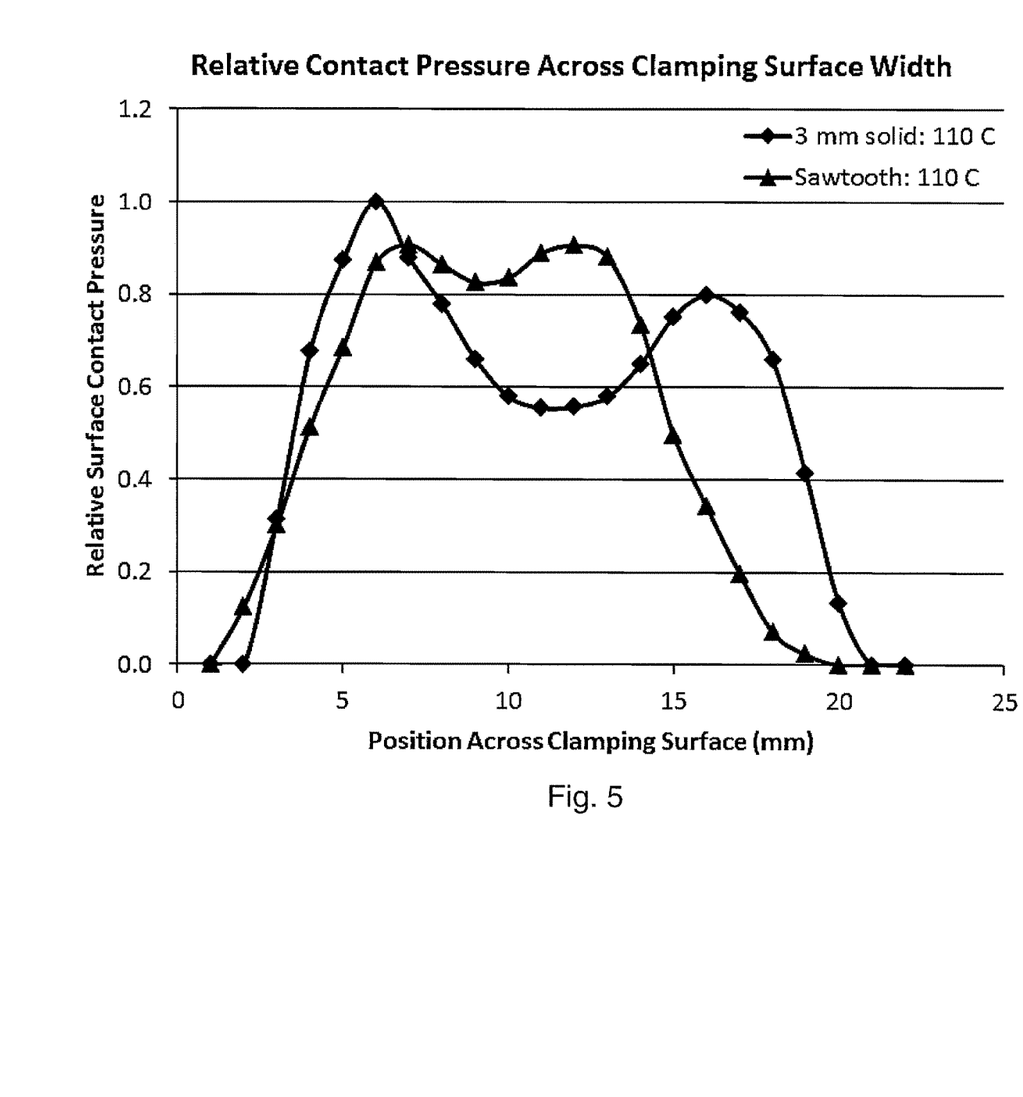
FIG. 5 is a comparative graph based on FEA runs of sealing contact forces for both improved and non-improved designs at high temperatures.

FIG. 5 is a comparative graph of sealing contact forces for both improved and non-improved designs at high temperature. The left side of graph depicts the relative surface contract pressure in relation to the position across the clamping surface. A receptacle end (23) with a 3 mm thick flat seal versus a 3 mm thick seal with sawtooth ribs, maintained at a temperature of 110 C, were analyzed.

Figure 6:
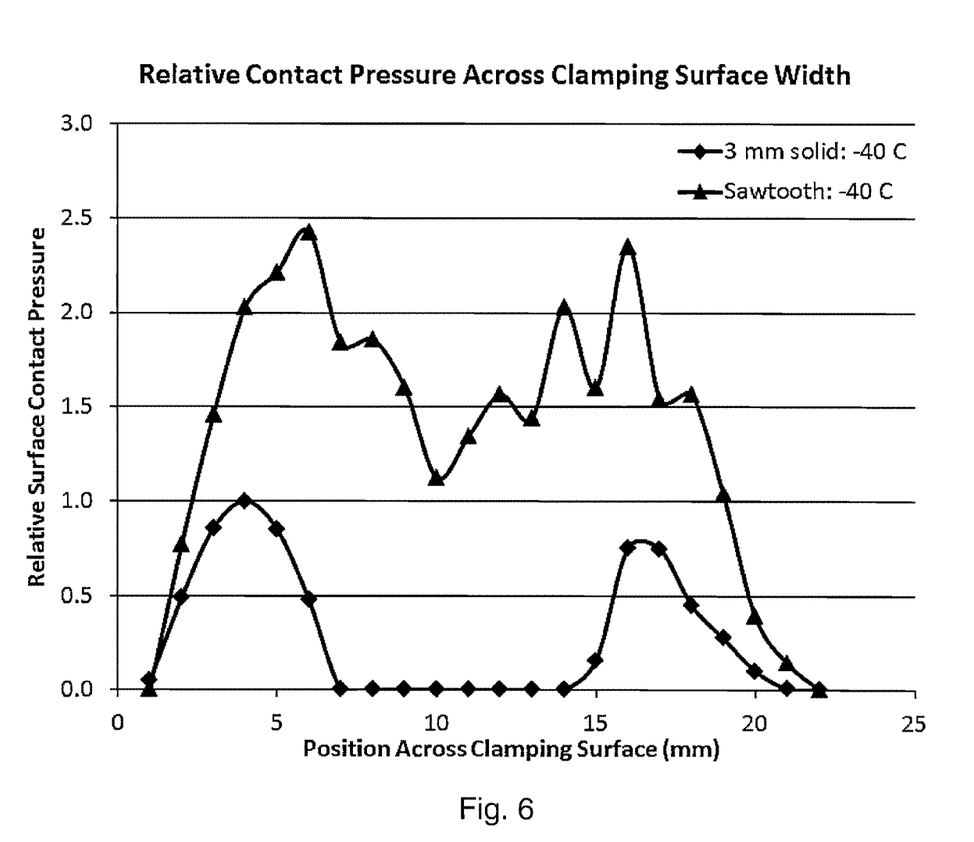
FIG. 6 is a comparative graph based on FEA runs of sealing contact forces for both improved and non-improved designs at low temperatures.

FIG. 6 is a comparative graph of sealing contact forces for both improved and non-improved designs at low temperature. The left side of graph depicts the relative surface contract pressure in relation to the position across the clamping surface. A receptacle end (23) with a 3 mm thick flat seal versus a 3 mm thick seal with sawtooth ribs, maintained at a temperature of −40 C, were analyzed.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims.

Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. An adaptive air intake joint for an internal combustion engine comprising:
    a first duct body (12) having an interior surface (15) formed from a continuous sidewall section (13) with a first diameter, a second continuous sidewall section (19) with a second diameter larger than said first diameter forming a recessed area extending from a catch tab (61) to an end (25) of said first duct body (12), said catch tab (61) positioned between said first continuous sidewall section (13) and said second continuous sidewall section (19) and formed from a first catch wall (27) extending perpendicular outwardly from said interior surface (15), a second catch wall (29) extending perpendicular outwardly from said interior surface (15) of second continuous sidewall section (19), and a sloped catch wall (32) formed between said first (27) and second (29) catch walls, said first duct body (12) further defined by an exterior surface (17) having at least two flexible sawtooth shaped ribs (14) located between first (16) and second (18) walls extending around said exterior surface (17);

a second duct body (29) having an latching tab (63) constructed and arranged to fit within said catch tab (61) of said first duct body (12) and an interior surface (31) formed by an insertion end (35) providing substantially the same diameter as said first duct body sidewall section (13), said latching tab (63) having a front insertion wall (42) with substantially the same orientation of said first catch wall (27), a rear insertion wall (44) with substantially the same orientation of said second catch wall (29), and a sloped insertion wall (46) with substantially the same orientation of said sloped catch wall (32) arranged to frictionally engage said catch tab (61);

a rear wall (30) formed along an exterior surface (33) for capturing an end (25) of said first duct body (12) upon installation and preventing detachment;

and a clamp (20) positioned over said ribs (14);

wherein said clamp (20) is tightened to cause compression of the ribs (14) to provide a constant pressure on the joint (41) whereby said first duct body (12) and said second duct body (29) form a sealed passageway without an overlapping joint protruding into the passageway.

2. The adaptive air intake joint for an internal combustion engine according to claim 1 wherein said ribs (14) are formed from rubber.

3. The adaptive air intake joint for an internal combustion engine according to claim 1 wherein said ribs (14) are formed from an elastomer.

4. The adaptive air intake joint for an internal combustion engine according to claim 1 wherein said ribs (14) has peaks (51) and valleys (53).

5. The adaptive air intake joint for an internal combustion engine according to claim 4 wherein said peaks (51) are rounded.

6. The adaptive air intake joint for an internal combustion engine according to claim 4 wherein said peaks are flat (42).

7. The adaptive air intake joint for an internal combustion engine according to claim 1 wherein said first (16) and second walls (18) positioned on either side of said ribs (14) have a height (H1) greater than a height (H2) of said ribs (14).

8. The adaptive air intake joint for an internal combustion engine according to claim 1 wherein said first body (12) and said second duct body (29) are tubular shaped.

* * * * *